United States Patent
Tao et al.

(10) Patent No.: US 9,073,753 B2
(45) Date of Patent: Jul. 7, 2015

(54) METHOD FOR MAKING HYDROPHILIC CARBON NANOTUBE FILM

(75) Inventors: Zhi-Min Tao, Beijing (CN); Li Fan, Beijing (CN); Wen-Mei Zhao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 738 days.

(21) Appl. No.: 12/978,549

(22) Filed: Dec. 25, 2010

(65) Prior Publication Data

US 2012/0101300 A1 Apr. 26, 2012

(30) Foreign Application Priority Data

Oct. 26, 2010 (CN) ............ 2010 1 0520058

(51) Int. Cl.
*C09C 1/56* (2006.01)
*D01F 9/12* (2006.01)
(Continued)

(52) U.S. Cl.
CPC ............ *B82Y 40/00* (2013.01); *C01B 31/0273* (2013.01); *B82Y 30/00* (2013.01)

(58) Field of Classification Search
CPC ............ C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 5/00; B82Y 10/00; B82Y 15/00; B82Y 20/00; B82Y 25/00; B82Y 30/22; B82Y 35/00; B82Y 40/00; B82Y 99/00; D01F 9/10; D01F 9/127; D01F 9/1271; D01F 9/1272; D01F 9/1273; D01F 9/1274; D01F 9/1275; D01F 9/1276; D01F 9/1277; D01F 9/1278
USPC ............ 423/447.1–447.3, 445 B, 460–461
See application file for complete search history.

(56) References Cited

U.S. PATENT DOCUMENTS 2,938,816 A    5/1960   Günther et al.
6,599,961 B1 *  7/2003   Pienkowski et al. .......... 523/120
(Continued)

FOREIGN PATENT DOCUMENTS

CN    1944535     4/2007
CN    101007631   8/2007
(Continued)

OTHER PUBLICATIONS

Xia, et al., A highly efficient gas-phase route for the oxygen functionalization of carbon nanotubes based on nitric acid vapor, Carbon 2009; 47: 919-922.*
(Continued)

*Primary Examiner* — Daniel C McCracken
(74) *Attorney, Agent, or Firm* — Novak Druce Connolly Bove + Quigg LLP

(57) ABSTRACT

A method for making a hydrophilic carbon nanotube film is provided. A reactor, an oxidative acid solution disposed in the reactor, and at least one primary carbon nanotube film are provided. The primary carbon nanotube film is set in the reactor disposed apart from the oxidative acid solution. The oxidative acid solution is then volatilized to form oxidative acid gas and the reactor is filled with the oxidative acid gas.

17 Claims, 9 Drawing Sheets

(51) Int. Cl.
*B82Y 40/00* (2011.01)
*C01B 31/02* (2006.01)
*B82Y 30/00* (2011.01)

(56) References Cited

U.S. PATENT DOCUMENTS

2007/0237959 A1* 10/2007 Lemaire .................. 428/408
2008/0170982 A1* 7/2008 Zhang et al. ............ 423/447.3
2008/0248235 A1* 10/2008 Feng et al. .............. 428/113
2010/0124646 A1 5/2010 Jiang et al.

FOREIGN PATENT DOCUMENTS

CN 101734646 6/2010
TW 200642953 12/2006

OTHER PUBLICATIONS

Mei Zhang et al, "Strong, Transparent, Multifunctional, Carbon Nanotube Sheets", Science, vol. 309, pp. 1215-1219, Aug. 19, 2005.

* cited by examiner

METHOD FOR MAKING HYDROPHILIC CARBON NANOTUBE FILM

RELATED APPLICATIONS

This application claims all benefits accruing under 35 U.S.C. §119 from China Patent Application No. 201010520058.0, filed on Oct. 26, 2010 in the China Intellectual Property Office, the contents of which are hereby incorporated by reference.

BACKGROUND

1. Technical Field

The present disclosure relates to a method for making hydrophilic carbon nanotube film.

2. Description of Related Art

A carbon nanotube film has been fabricated by drawing from a carbon nanotube array disclosed in U.S. Patent Application Publication No. 20080248235A1 to Feng et al, to meet the increasing needs of forming separate and tiny carbon nanotubes into manipulable carbon nanotube structures. The carbon nanotube film is free standing and includes a plurality of carbon nanotubes joined end-to-end by Van der Waals attractive force therebetween. The carbon nanotubes in the carbon nanotube film are substantially aligned along the lengthwise direction of the carbon nanotube film, which has good properties, such as thermal and electrical conductivities, along the direction of the aligned carbon nanotubes. The carbon nanotube film is substantially transparent and can be used as a conductive thin film. Therefore, the carbon nanotube film can be used in many different fields.

However, surfaces of the carbon nanotubes are hydrophobic and cannot be infiltrated with water and other polar solvents. Accordingly, carbon nanotube films are hydrophobic, thereby limiting the use of carbon nanotube film.

What is needed, therefore, is a method for making hydrophilic carbon nanotube film that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
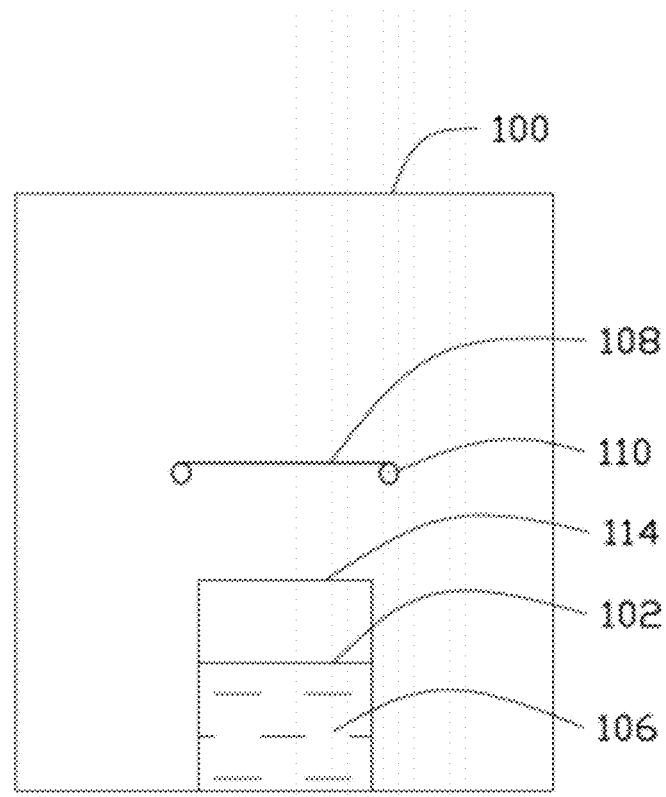
FIG. 1 is a schematic view of an apparatus according to one embodiment for making a hydrophilic carbon nanotube film.
Figure 2:
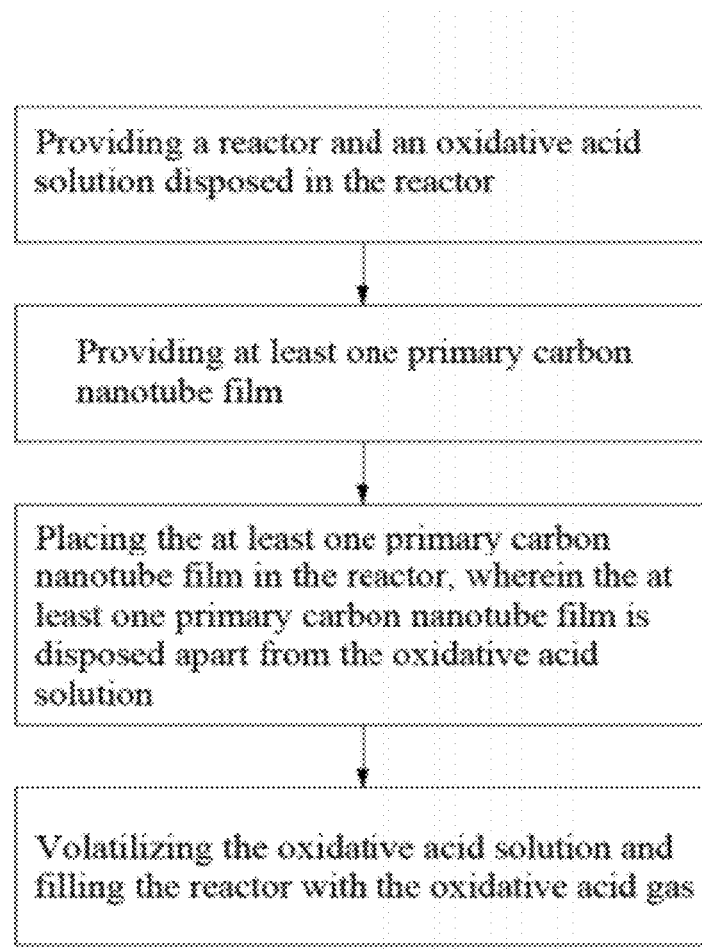
FIG. 2 is a flow chart of a method according to one embodiment for making a hydrophilic carbon nanotube film.

Referring to FIGS. 1 and 2, a method for making a hydrophilic carbon nanotube film to one embodiment is shown. The method includes the following steps:

S1: providing a reactor 100 and an oxidative acid solution 102 disposed in the reactor 100;

S2: providing at least one primary carbon nanotube film 108;

S3: placing the primary carbon nanotube film 108 in the reactor 100, wherein the primary carbon nanotube film 108 is disposed apart from the oxidative acid solution 102; and S4: volatilizing the oxidative acid solution 102 and filling the reactor 100 with the oxidative acid gas.

In step S1, the reactor 100 can be a sealed reactor. A material of the reactor 100 should not be dissolved in or react with oxidative acid solution 102. The material of the reactor 100 can be resin or ceramic. The resin can be polytetrafluoroethylene (PTFE). In one embodiment, the reactor 100 is a reaction kettle made of PTFE. The oxidative acid solution 102 is disposed in the reactor 100. The oxidative acid solution 102 can be disposed in a container 106 having an opening 114, and the container 106 is disposed in the reactor 100. The oxidative acid solution 102 includes an oxidative acid and a solvent. The oxidative acid can be nitric acid, sulfuric acid, or a mixture thereof. The solvent can be water. A weight percentage of the oxidative acid in the oxidative acid solution 102 can be in a range from about 40% to about 90%. In one embodiment, the oxidative acid is nitric acid, and the weight percentage of the oxidative acid is about 60%. Carbon nanotubes are composed of a five-membered carbon ring or six-membered carbon ring. The oxidative acid can open the five-membered carbon ring or the six-membered carbon ring, and a carboxyl group can be attached to the carbon nanotubes, thereby making the carbon nanotubes hydrophilic.

In step S2, the at least one primary carbon nanotube film can include one primary carbon nanotube film or a plurality of primary carbon nanotube films. If the at least one primary carbon nanotube film includes a plurality of primary carbon nanotube film, the primary carbon nanotube films can be overlapped with each other or separated from each other. In one embodiment according to FIG. 1, the at least one primary carbon nanotube film is one primary carbon nanotube film. The primary carbon nanotube film includes a plurality of carbon nanotubes joined by van der Waals attractive force therebetween. The primary carbon nanotube film can be a substantially pure structure of carbon nanotubes, with few impurities. The primary carbon nanotube film can be a free-standing structure, that is, the primary carbon nanotube film can be supported by itself without a substrate. For example, if at least one point of the primary carbon nanotube film is held, the entire primary carbon nanotube film can be lifted without being destroyed. The primary carbon nanotube film with a plurality of carbon nanotubes also has a larger specific surface area because the carbon nanotube has a large specific surface area. The carbon nanotubes in the primary carbon nanotube film can be orderly or disorderly arranged. The term 'disordered primary carbon nanotube film' refers to a structure where the carbon nanotubes are arranged along different directions, and the aligned directions of the carbon nanotubes are random. The number of the carbon nanotubes arranged along each different direction can be almost the same (e.g. uniformly disordered). The disordered primary carbon nanotube film can be isotropic, namely the primary carbon nanotube film has properties identical in all directions of the primary carbon nanotube film. The carbon nanotubes in the disordered primary carbon nanotube film can be entangled with each other.

The primary carbon nanotube film can be a drawn carbon nanotube film, a pressed carbon nanotube film, or a flocculated carbon nanotube film.

A method of making a drawn carbon nanotube film includes the steps of:

S21: providing an array of carbon nanotubes; and

S22: pulling out at least one drawn carbon nanotube film from the carbon nanotube array.

In step S21, a method of making the array of carbon nanotubes includes:

S211: providing a substantially flat and smooth substrate;

S212: applying a catalyst layer on the substrate;

S213: annealing the substrate with the catalyst at a temperature in the approximate range of about 700° C. to about 900° C. in air for about 30 minutes to about 90 minutes;

S214: heating the substrate with the catalyst at a temperature in the approximate range from about 500° C. to about 740° C. in a furnace with a protective gas therein; and S215: supplying a carbon source gas to the furnace for about 5 minutes to about 30 minutes and growing a super-aligned array of the carbon nanotubes from the substrate.

In step S211, the substrate can be a P or N-type silicon wafer. In one embodiment, a 4-inch P-type silicon wafer is used as the substrate.

In step S212, the catalyst can be made of iron (Fe), cobalt (Co), nickel (Ni), or any combination alloy thereof.

In step S214, the protective gas can be made up of at least one of nitrogen ($N_2$), ammonia ($NH_3$), and a noble gas.

In step S215, the carbon source gas can be a hydrocarbon gas, such as ethylene ($C_2H_4$), methane ($CH_4$), acetylene ($C_2H_2$), ethane ($C_2H_6$), or any combination thereof.

In step S22, the drawn carbon nanotube film can be fabricated by the steps of:

S221: selecting one or more carbon nanotubes having a predetermined width from the array of carbon nanotubes; and S222: pulling the carbon nanotubes to obtain nanotube segments at an substantially even/uniform speed to achieve a uniform carbon nanotube film.

In step S221, the carbon nanotube segment includes a number of substantially parallel carbon nanotubes. The carbon nanotube segments can be selected by using an adhesive tape as a tool to contact the super-aligned array of carbon nanotubes. In step S222, the pulling direction can be substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width.

After the step of S22, the drawn carbon nanotube film can be treated by applying organic solvent to the drawn carbon nanotube film and soaking the entire surface of the carbon nanotube film. The organic solvent is volatile and can be ethanol, methanol, acetone, dichloromethane, chloroform, or any appropriate mixture thereof. In the one embodiment, the organic solvent is ethanol. After being soaked by the organic solvent, adjacent carbon nanotubes in the carbon nanotube film that are able to do so, bundle together, due to the surface tension of the organic solvent as the organic solvent volatilizes. Due to the decrease of the specific surface area from bundling, the mechanical strength and toughness of the drawn carbon nanotube film increase and the coefficient of friction of the carbon nanotube films decreases. Macroscopically, the drawn carbon nanotube film will be an approximately uniform film.

The width of the drawn carbon nanotube film depends on the size of the carbon nanotube array. The length of the drawn carbon nanotube film can be set as desired. In one embodiment, when the substrate is a 4 inch type wafer, a width of the carbon nanotube film can be in an approximate range from 1 centimeter (cm) to 10 cm, the length of the carbon nanotube film can reach to about 120 m, the thickness of the drawn carbon nanotube film can be in a range from about 0.5 nm to about 100 microns. Multiple films can be adhered together to obtain a film of any desired size.

A method of making the pressed carbon nanotube film includes the following steps:

S21': providing a carbon nanotube array and a pressing device; and

S22': pressing the array of carbon nanotubes to obtain a pressed carbon nanotube film.

In step S21', the carbon nanotube array can be made by the same method as step S21.

In the step S22', a certain pressure can be applied to the array of carbon nanotubes by the pressing device. In the process of pressing, the carbon nanotubes in the array of carbon nanotubes separate from the substrate and obtain the carbon nanotube film under pressure. The carbon nanotubes are substantially parallel to a surface of the carbon nanotube film.

In one embodiment, the pressing device can be a pressure head. The pressure head has a smooth surface. The shape of the pressure head and the pressing direction can determine the direction of the carbon nanotubes arranged therein. When a pressure head (e.g. a roller) is used to travel across and press the array of carbon nanotubes along a predetermined single direction, a carbon nanotube film having a number of carbon nanotubes primarily aligned along a same direction is obtained. It can be understood that there may be some variation in the film. Different alignments can be achieved by applying the roller in different directions over an array. Variations on the film can also occur when the pressure head is used to travel across and press the array of carbon nanotubes several times, with the variation occurring in the orientation of the nanotubes. Variations in pressure can also achieve different angles between the carbon nanotubes and the surface of the semiconducting layer on the same film. When a planar pressure head is used to press the array of carbon nanotubes along the direction substantially perpendicular to the substrate, a carbon nanotube film having a number of carbon nanotubes isotropically arranged can be obtained. When a roller-shaped pressure head is used to press the array of carbon nanotubes along a certain direction, a carbon nanotube film having a number of carbon nanotubes aligned substantially along the certain direction is obtained. When a roller-shaped pressure head is used to press the array of carbon nanotubes along different directions, a carbon nanotube film having a number of sections having carbon nanotubes aligned along different directions is obtained.

The flocculated carbon nanotube film can be made by the following method:

S21": providing a carbon nanotube array;

S22": separating the array of carbon nanotubes from the substrate to obtain a number of carbon nanotubes;

S23": adding the number of carbon nanotubes to a solvent to obtain a carbon nanotube floccule structure in the solvent; and S24": separating the carbon nanotube floccule structure from the solvent, and shaping the separated carbon nanotube floccule structure into a carbon nanotube film to achieve a flocculated carbon nanotube film.

In step S21", the carbon nanotube array can be fabricated by the same method as step S21.

In step S22", the array of carbon nanotubes is scraped off the substrate to obtain a number of carbon nanotubes. The length of the carbon nanotubes can be above 10 microns.

In step S23", the solvent can be selected from water or volatile organic solvent. After adding the number of carbon nanotubes to the solvent, a process of flocculating the carbon nanotubes can be suitably executed to create the carbon nanotube floccule structure. The process of flocculating the carbon nanotubes can be selected from ultrasonic dispersion of the carbon nanotubes or agitating the carbon nanotubes. In one embodiment ultrasonic dispersion is used to flocculate the solvent containing the carbon nanotubes for about 10 to about 30 minutes. Due to the carbon nanotubes in the solvent having a large specific surface area and the tangled carbon nanotubes having a large van der Waals attractive force, the flocculated and tangled carbon nanotubes form a network structure (e.g., floccule structure).

In step S24", the process of separating the floccule structure from the solvent includes the sub-steps of:

S24"a: filtering out the solvent to obtain the carbon nanotube floccule structure; and S24"b: drying the carbon nanotube floccule structure to obtain the separated carbon nanotube floccule structure.

In step S24"a, the carbon nanotube floccule structure can be disposed in room temperature for a period of time to dry the organic solvent therein. The time of drying can be selected according to practical needs. The carbon nanotubes in the carbon nanotube floccule structure are tangled together.

In step S24"b, the process of shaping includes the sub-steps of:

S24"b1: putting the separated carbon nanotube floccule structure on a supporter (not shown), and spreading the carbon nanotube floccule structure to obtain a predetermined structure;

S24"b2: pressing the spread carbon nanotube floccule structure with a determined pressure to yield a desirable shape; and S24"b3: removing the residual solvent contained in the spread floccule structure to obtain the flocculated carbon nanotube film.

Through the flocculating, the carbon nanotubes are tangled together by van der Waals attractive force to obtain a network structure/floccule structure. Thus, the flocculated carbon nanotube film has good tensile strength.

In one embodiment, the primary carbon nanotube film is a drawn carbon nanotube film which includes a plurality of carbon nanotubes joined end-to-end by van der Waals attractive force. The carbon nanotubes in the primary carbon nanotube film are substantially oriented in a same direction.

In step S3, the primary carbon nanotube film 108 can be disposed on a supporter 110. The supporter 110 can have a sheet structure. The primary carbon nanotube film 108 can be located on a surface of the supporter 110. The primary carbon nanotube film 108 can be attached on an inner surface of the reactor 100. In one embodiment according to FIG. 1, the supporter 110 has a frame structure, and the primary carbon nanotube film 108 is hung in the air in the reactor 100 via the supporter 110. The supporter 110 includes two bars fixed on the inner surface of the reactor 100. Two opposite ends of the primary carbon nanotube film 108 are separately fixed on the two bars. The primary carbon nanotube film 108 faces the opening 114 of the container 106. In another embodiment, the at least one primary carbon nanotube film can be disposed on the inner surface of the reactor 100.

Figure 3:
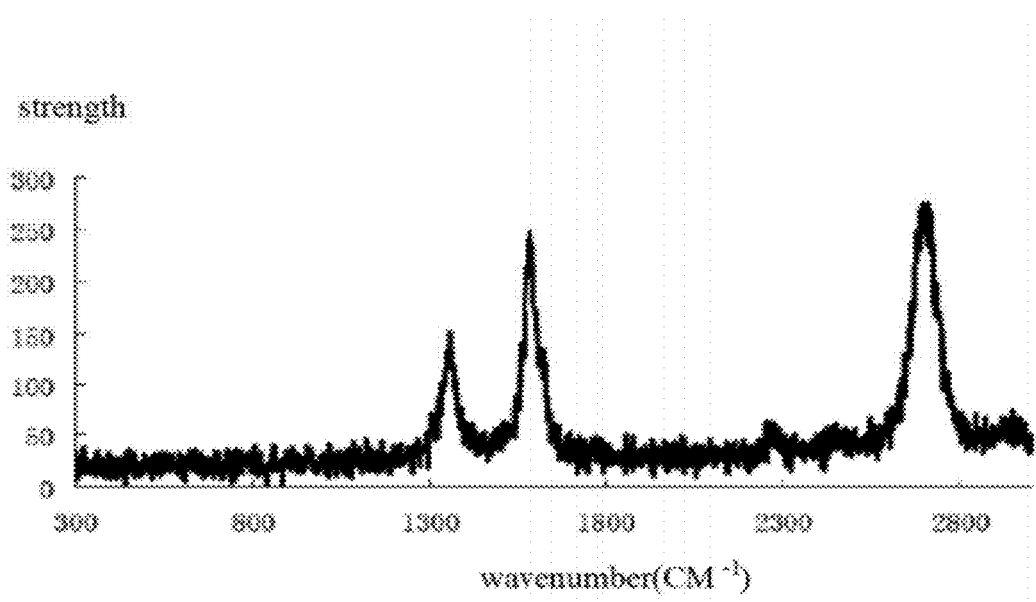
FIG. 3 is a Raman spectrum graph of a primary carbon nanotube film surface.
Figure 4:
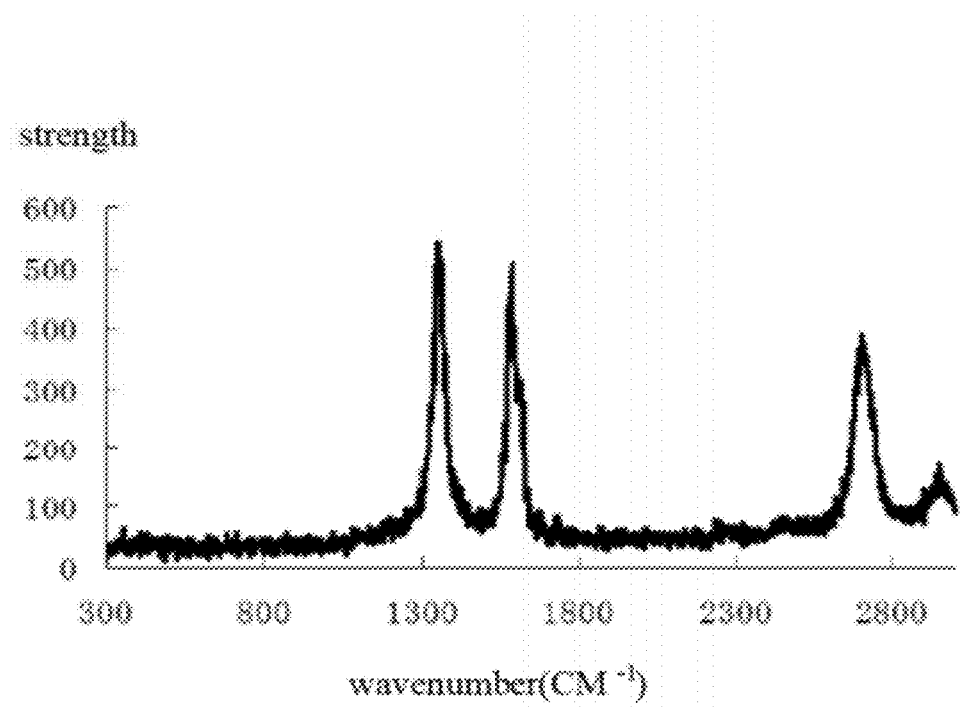
FIG. 4 is a Raman spectrum graph of a hydrophilic carbon nanotube film surface.
Figure 5:
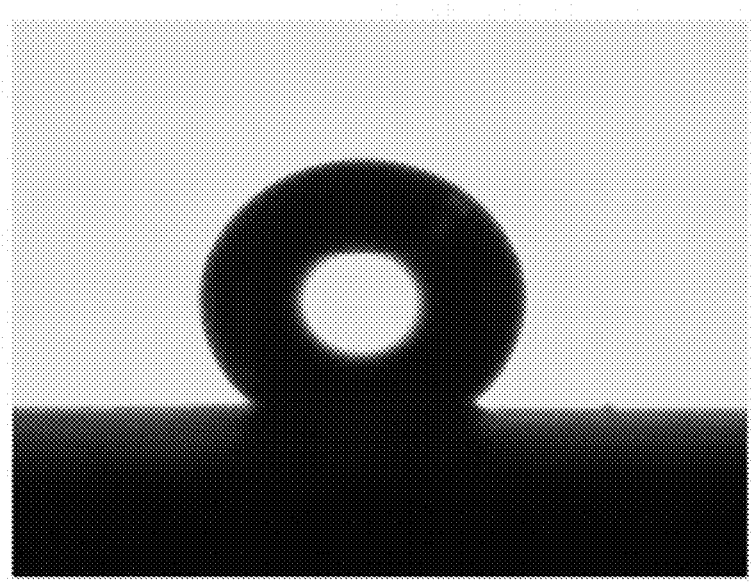
FIG. 5 is a Scanning Electron Microscope image of a water drop on a surface of a primary carbon nanotube film.
Figure 6:
FIG. 6 is a Scanning Electron Microscope image of a water drop on a surface of a hydrophilic carbon nanotube film.

In step S4, the reactor 100 is heated to a temperature until the oxidative acid solution 102 is volatilized to form oxidative acid solution gas. The temperature is maintained for about 3 hours to about 8 hours. The temperature is related to a boiling point of oxidative acid solution 102, and can be in a range from about 100° C. to about 200° C. The reactor 100 is filled with oxidative acid solution gas. The primary carbon nanotube film 108 reacts with the oxidative acid in the oxidative acid solution gas, and a plurality of carboxyl groups is attached to surfaces of the carbon nanotubes in the primary carbon nanotube film 108. Because the carboxyl group is hydrophilic, and the surfaces of the carbon nanotubes become hydrophilic, the primary carbon nanotube film 108 becomes a hydrophilic carbon nanotube film. The primary carbon nanotube film 108 will not be destroyed in this step because it is reacting with a gas. Referring to FIGS. 3-4, comparing the Raman spectrum graph of the primary carbon nanotube film surface with the hydrophilic carbon nanotube film, carboxyl groups are found on the surface of the hydrophilic carbon nanotube film. Referring to FIG. 5, one carbon nanotube of the primary carbon nanotube film is disposed on a surface of water, and the water does not infiltrate the carbon nanotube of the primary carbon nanotube film. Referring to FIG. 6, one carbon nanotube of the hydrophilic carbon nanotube film is disposed on the surface of water, and the water can infiltrate the carbon nanotube of the hydrophilic carbon nanotube film.

A step of washing the hydrophilic carbon nanotube film can be further provided. The hydrophilic carbon nanotube film can be washed for about 3 times to about 5 times with water or deionized water to remove the oxidative acid that does not react with the primary carbon nanotube film. In one embodiment, the step of washing the hydrophilic carbon nanotube film includes the following sub-steps of: providing a frame and some water; fixing an edge of the hydrophilic carbon nanotube film on the frame; and repeatedly immerging the frame and the hydrophilic carbon nanotube film in the water and perpendicularly raising the frame and the hydrophilic carbon nanotube film from the water. In another embodiment, the steps of washing the hydrophilic carbon nanotube film can be carried out by the following sub-steps of: providing a substrate; laying the hydrophilic carbon nanotube film on a surface of the substrate; and washing down the hydrophilic carbon nanotube film with water. Alternatively, the hydrophilic carbon nanotube film can be further turned around, and then can be laid on the substrate, and washed with water.

Figure 7:
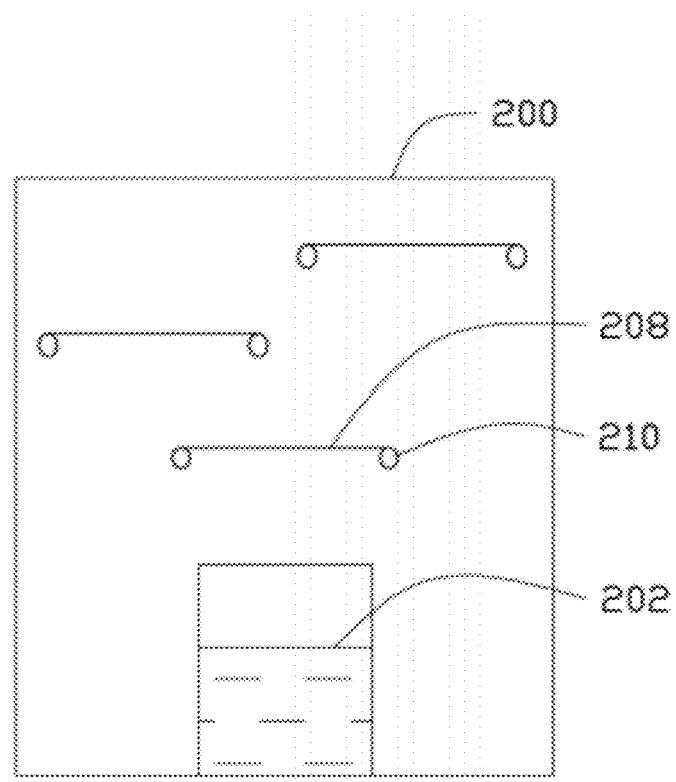
FIG. 7 is a schematic view of an apparatus according to another embodiment for making a hydrophilic carbon nanotube film.

Referring to FIG. 7, a method for making a plurality of hydrophilic carbon nanotubes film according to another embodiment is provided. The method includes:

N1: providing a reactor 200 and an oxidative acid solution 202 disposed in the reactor 200;

N2: providing a plurality of primary carbon nanotube films 208;

N3: placing the primary carbon nanotube films 208 in the reactor 200, wherein the primary carbon nanotube films 208 are disposed apart from the oxidative acid solution 202; and N4: volatilizing the oxidative acid solution 202 and filling the reactor 200 with the oxidative acid gas.

The step N1 is the same as the step S1 disclosed above.

In the step N2, the plurality of primary carbon nanotube films 208 are separated from each other. In the embodiment according to FIG. 7, three primary carbon nanotube films 208 are provided. The other characteristics of the step N2 are the same as the step S2 disclosed above.

In the step N3, a plurality of supporters 210 is provided. One supporter 210 corresponds to one primary carbon nanotube film 208. In the embodiment according to FIG. 7, three supporters 210 are provided to correspond to the three primary carbon nanotube films 208. The other characteristics of the step N3 are the same as the step S3 disclosed above.

Figure 8:
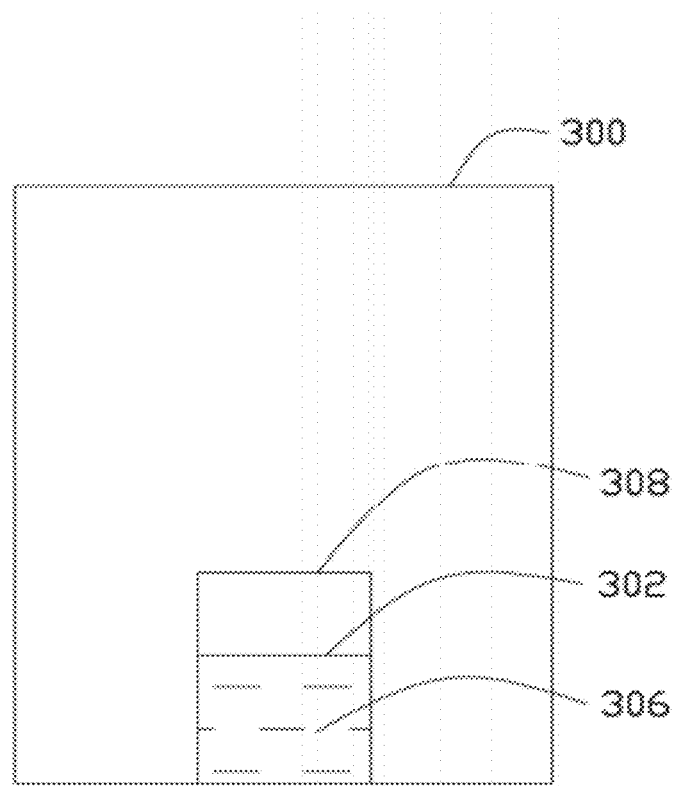
FIG. 8 is a schematic view of an apparatus according to yet another embodiment for making a hydrophilic carbon nanotube film.

Referring to FIG. 8, a method for making a plurality of hydrophilic carbon nanotubes film according to yet another embodiment is provided. The method includes the following steps:

M1: providing a reactor 300 and an oxidative acid solution 302 disposed in the reactor 300;

M2: providing at least one primary carbon nanotube film 308;

M3: placing the at least one primary carbon nanotube film 308 in the reactor 300, wherein the at least one primary carbon nanotube film 308 is disposed apart from the oxidative acid solution 302; and M4: volatilizing the oxidative acid solution 302 and filling the sealed reactor 300 with the oxidative acid gas.

The characteristics of step M1 are the same as step S1 disclosed above.

The characteristics of step M2 are the same as step S2 disclosed above.

In the step M3, the at least one primary carbon nanotube film 308 is disposed on a container 306 and covers an opening of the container 306. The at least one carbon nanotube film 308 is supported by side walls of the container 306. The oxidative acid solution 302 is disposed in the container 306. The other characteristics of step M3 are the same as step S3 disclosed above.

The characteristics of step M4 are the same as step S4 disclosed above.

Figure 9:
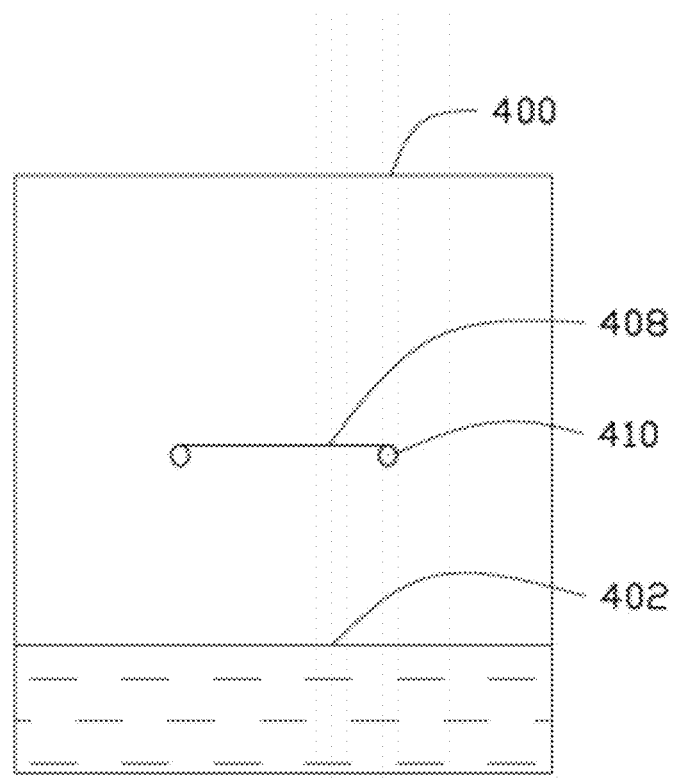
FIG. 9 is a schematic view of an apparatus according to still another embodiment for making a hydrophilic carbon nanotube film.

Referring to FIG. 9, a method for making a plurality of hydrophilic carbon nanotubes film according to still another embodiment is provided. The method includes the following steps:

L1: providing a reactor 400 and an oxidative acid solution 402 disposed in the reactor 400;

L2: providing at least one primary carbon nanotube film 408;

L3: placing the at least one primary carbon nanotube film 408 in the reactor 400, wherein the at least one primary carbon nanotube film 408 is disposed apart from the oxidative acid solution 402; and L4: volatilizing the oxidative acid solution 402 and filling the reactor 400 with the oxidative acid gas.

In the step L1, the reactor 400 is used as a container of the oxidative acid solution 402, and an extra container for containing the oxidative acid solution 402 is not necessary. The other characteristics of step L1 are the same as the disclosed above step S1.

The characteristics of step L2 are the same as the disclosed above step S2.

The characteristics of step L3 are the same as the disclosed above step S3.

The characteristics of step L4 are the same as the disclosed above step S4.

It is to be understood that the above-described embodiments are intended to illustrate rather than limit the present disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a hydrophilic carbon nanotube film, the method comprising the following steps:
   S1: providing a reactor and an oxidative acid solution disposed in the reactor;
   S2: providing a plurality of primary carbon nanotube films;
   S3: placing the plurality of primary carbon nanotube films in the reactor, wherein the plurality of primary carbon nanotube films are overlapped and separated from each other, and the plurality of primary carbon nanotube films are disposed apart from the oxidative acid solution; and
   S4: filling the reactor with the oxidative acid gas to react with the plurality of primary carbon nanotube films by volatilizing the oxidative acid solution.

2. The method of claim 1, wherein each adjacent two of the plurality of primary carbon nanotube films are spaced apart from each other.

3. The method of claim 1, wherein each of the plurality of primary carbon nanotube films is hung in air in the reactor via a supporter.

4. The method of claim 3, wherein the supporter is fixed in the reactor.

5. The method of claim 1, wherein two opposite ends of each of the plurality of primary carbon nanotube films are separately fixed on two bars.

6. The method of claim 1, wherein the plurality of primary carbon nanotube films are parallel with each other.

7. The method of claim 1, wherein in the step S2, each of the plurality of primary carbon nanotube films is made by the following steps:
   providing a carbon nanotube array; and
   pulling out the primary carbon nanotube film from the carbon nanotube array.

8. The method of claim 1, wherein each of the plurality of primary carbon nanotube films is a freestanding structure.

9. The method of claim 8, wherein each of the plurality of primary carbon nanotube films is a pure structure of carbon nanotubes.

10. The method of claim 1, wherein each of the plurality of primary carbon nanotube films is treated by applying organic solvent to each of the plurality of primary carbon nanotube films.

11. The method of claim 10, wherein the organic solvent is applied by soaking the entire surface of each of the plurality of primary carbon nanotube films into the organic solvent.

12. The method of claim 1, further comprising a step of washing the hydrophilic carbon nanotube film comprising:
   providing a frame and water;
   fixing an edge of the hydrophilic carbon nanotube film on the frame; and repeatedly immerging the frame and the hydrophilic carbon nanotube film in the water and perpendicularly raising the frame and the hydrophilic carbon nanotube film from the water.

13. The method of claim 1, wherein the oxidative acid is nitric acid, sulfuric acid, or a mixture thereof.

14. A method for making a hydrophilic carbon nanotube film, the method comprising the following steps:
- S1: providing a reactor, wherein a container is disposed in the reactor and has an opening, and an oxidative acid solution is received in the container;
- S2: providing a plurality of primary carbon nanotube films;
- S3: placing the plurality of primary carbon nanotube films in the reactor, wherein the plurality of primary carbon nanotube films are overlapped and separated apart from each other, and the plurality of primary carbon nanotube films are disposed apart from the container; and
- S4: filling the reactor with the oxidative acid gas to react the plurality of primary carbon nanotube films by volatilizing the oxidative acid solution.

15. The method of claim 14, wherein the plurality of primary carbon nanotube films are hung in the air and suspended above the opening.

16. The method of claim 14, wherein the plurality of primary carbon nanotube films are overlapped and attached on an inner surface of the reactor.

17. A method for making a hydrophilic carbon nanotube film, the method comprising the following steps:
- providing a reactor and an oxidative acid solution disposed in the reactor;
- placing a plurality of first carbon nanotube films in the reactor, wherein the plurality of first carbon nanotube films are overlapped and separated apart from each other, and the plurality of first carbon nanotube films are disposed apart from the oxidative acid solution; and
- filling the reactor with the oxidative acid gas to react with the plurality of first carbon nanotube films to form a plurality of second carbon nanotube films by volatilizing the oxidative acid solution;
- fixing an edge of each of the plurality of second carbon nanotube films on a frame; and
- washing each of the plurality of second carbon nanotube films by repeatedly immerging the frame and each of the plurality of second carbon nanotube films in water.

* * * * *